US006298906B1

(12) United States Patent
Vize (10) Patent No.: US 6,298,906 B1
(45) Date of Patent: Oct. 9, 2001

(54) APPARATUS FOR SECURING AND SEALING A RADIATOR TO AN ENGINE COWLING OF A WORK MACHINE

(75) Inventor: Robert M. Vize, Aurora, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 08/982,624

(22) Filed: Dec. 2, 1997

(51) Int. Cl.[7] .................................. F28F 9/00; F28F 9/22
(52) U.S. Cl. ............................. 165/41; 165/67; 165/69; 165/149; 165/51; 165/122; 180/68.1; 180/68.4
(58) Field of Search ........................... 165/41, 44, 67, 165/69, 149, 51, 122; 180/68.1, 68.4

(56) References Cited

U.S. PATENT DOCUMENTS

| | | | | |
|---|---|---|---|---|
| 1,077,933 | * | 11/1913 | Hewitt ........................ | 180/68.4 |
| 1,113,790 | * | 10/1914 | Lasko et al. ............... | 180/68.4 |
| 1,282,451 | * | 10/1918 | Moore ........................ | 180/68.4 |
| 1,432,461 | * | 10/1922 | Harris et al. .............. | 180/68.4 |
| 1,593,242 | * | 7/1926 | Cutler ........................ | 180/68.4 |
| 1,593,243 | * | 7/1926 | Cutler ........................ | 180/68.4 |
| 1,593,244 | * | 7/1926 | Cutler ........................ | 180/68.4 |
| 1,840,417 | * | 1/1932 | Seelert ....................... | 165/69 |
| 2,180,854 | * | 11/1939 | Soule ......................... | 165/149 |
| 2,434,988 | * | 1/1948 | Christensen ............... | 165/149 |
| 2,615,687 | * | 10/1952 | Simmons ................... | 165/149 |
| 2,715,448 | * | 8/1955 | Zeeb .......................... | 180/68.4 |
| 3,093,189 | * | 6/1963 | Panthofer .................. | 165/69 |
| 3,207,250 | | 9/1965 | Bamford .................... | 180/68 |
| 3,645,350 | * | 2/1972 | Deli et al. .................. | 180/68.4 |
| 3,788,419 | | 1/1974 | Drone et al. ............... | 180/68 R |
| 3,933,136 | * | 1/1976 | Burst .......................... | 165/51 |
| 4,137,982 | | 2/1979 | Crews et al. ............... | 180/68 R |
| 4,227,570 | | 10/1980 | Crews ........................ | 165/67 |
| 4,287,961 | | 9/1981 | Steiger ....................... | 180/68 R |
| 4,345,641 | * | 8/1982 | Hauser ....................... | 165/41 |
| 4,367,793 | * | 1/1983 | MacIntosh ................. | 180/68.4 |
| 4,397,348 | * | 8/1983 | Klem ......................... | 165/41 |
| 4,403,648 | | 9/1983 | Styok ......................... | 165/76 |
| 4,730,664 | * | 3/1988 | Frosthuber et al. ....... | 165/51 |
| 5,036,931 | * | 8/1991 | Iritani ........................ | 180/68.4 |
| 5,360,059 | * | 11/1994 | Olson ......................... | 165/67 |
| 5,476,138 | * | 12/1995 | Iwasaki et al. ............ | 165/41 |
| 5,566,954 | | 10/1996 | Hahn .......................... | 277/184 |
| 5,597,047 | | 1/1997 | Thompson et al. ........ | 180/68.4 |
| 5,623,893 | | 4/1997 | Bartz et al. ................ | 123/41.49 |

FOREIGN PATENT DOCUMENTS

| | | | | |
|---|---|---|---|---|
| 250 821 | * | 5/1963 | (AU) ......................... | 180/68.4 |
| 311 157 | * | 2/1919 | (DE) ......................... | 180/68.4 |
| 1755007 | * | 12/1971 | (DE) ......................... | 180/68.4 |
| 559655 | * | 12/1922 | (FR) .......................... | 165/76 |
| 633111 | * | 1/1928 | (FR) .......................... | 180/68.4 |
| 2313252 | * | 12/1976 | (FR) .......................... | 165/148 |
| 154835 | * | 12/1920 | (GB) .......................... | 165/148 |
| 0633233 | * | 12/1949 | (GB) .......................... | 165/67 |
| 0161687 | * | 9/1984 | (JP) ........................... | 165/122 |
| 4-133813 | * | 5/1992 | (JP) ........................... | 165/44 |

* cited by examiner

Primary Examiner—John K. Ford
(74) Attorney, Agent, or Firm—Maginot, Addison & Moore (57) ABSTRACT

A radiator assembly for a work machine is disclosed. The radiator assembly includes an engine cowling having a mounting flange secured thereto. A radiator is secured to the mounting flange. A bulb seal is provided to create an air-tight seal between the mounting flange and a heat exchange assembly of the radiator. The radiator assembly also includes a rear shroud and a fan assembly for creating a flow of air through the radiator assembly. The radiator assembly disclosed herein reduces the frequency and magnitude of vibrations or loads exerted on the radiator during operation of the work machine. Moreover, by creating an air-tight seal between the radiator and the engine cowling, leakage of air around the heat exchange assembly of the radiator is reduced relative to radiator assemblies which have heretofore been designed thereby increasing the efficiency associated with the work machine's cooling system.

16 Claims, 7 Drawing Sheets

APPARATUS FOR SECURING AND SEALING A RADIATOR TO AN ENGINE COWLING OF A WORK MACHINE

TECHNICAL FIELD OF THE INVENTION

The present invention relates generally to a work machine, and more particularly to an apparatus for securing and sealing a radiator to an engine cowling of a work machine.

BACKGROUND OF THE INVENTION

A work machine, such as a wheel or track skidder, typically includes a radiator assembly for cooling a liquid, such as engine coolant. The radiator assembly includes a radiator which is typically secured to a forward portion of the work machine thereby allowing air to be directed through the radiator's heat exchanger core, including the coils and fins associated therewith, during operation of the work machine.

Generally, a lower portion of the radiator is bolted or otherwise secured directly to the chassis of the work machine, whereas an upper portion of the radiator is bolted or otherwise secured to a body panel or the like associated with work machine. Thereafter, a number of mud flaps or the like are positioned around the periphery of the radiator in order to direct air toward the radiator's heat exchanger core.

However, radiator assemblies which have heretofore been designed have a number of drawbacks associated therewith. For example, by bolting the lower portion of the radiator directly to the chassis, vibrations or loads exerted on the chassis as the work machine is operated or otherwise advanced across rough terrain are transmitted through the chassis and to the radiator. Moreover, by also bolting the upper portion of the radiator to a body panel associated with the work machine, such vibrations or loads transmitted from the chassis cause twisting and torquing of the radiator thereby potentially reducing the useful life of the radiator. It should be appreciated that such twisting or torquing of the radiator is the result of transferring loads or vibrations to the radiator when the lower portion of the radiator is bolted to a first structure (i.e. the chassis), while the upper portion of the radiator is bolted to a second, separate structure (i.e. the body panel associated with the work machine).

Moreover, use of mud flaps around the periphery of the radiator may allow a portion of the flow of air advancing into the front of the work machine to bypass the radiator's heat exchanger core. In particular, a relatively air tight seal is not created between the mud flaps and the radiator thereby allowing air to leak around or otherwise bypass contact with the radiator's heat exchanger core.

What is needed therefore is an apparatus for securing and sealing a radiator to an engine cowling of a work machine which overcomes one or more of the above-mentioned drawbacks.

DISCLOSURE OF THE INVENTION

In accordance with a first embodiment of the present invention, there is provided a radiator assembly of a work machine. The radiator assembly includes an engine cowling defining an interior surface. The engine cowling has a mounting flange secured to the interior surface. The mounting flange extends completely around the interior surface so as to define a central passage therethrough. The assembly includes a radiator secured to the mounting flange. The radiator assembly also includes (i) a heat exchange assembly, and (ii) a sealing surface which is configured to define an air flow access opening through which a flow of air is advanced so as to contact the heat exchange assembly. The radiator assembly further includes a sealing member interposed between the mounting flange and the sealing surface. The sealing member completely surrounds the access opening whereby an air-tight seal is formed between the radiator and the engine cowling when the radiator is secured to the mounting flange.

In accordance with a second embodiment of the present invention, there is provided a radiator assembly of a work machine. The radiator assembly includes an engine cowling defining an interior surface. The engine cowling has a mounting flange secured to the interior surface. The mounting flange extends completely around the interior surface so as to define a central passage therethrough. The engine cowling includes a left lateral side structure, a right lateral side structure, and a top structure which are configured to define a radiator chamber. The mounting flange is secured to each of the left lateral side structure, the right lateral side structure, and the top structure. Each of the left lateral side structure and the right lateral side structure is fastened to a chassis of the work machine. The assembly also includes a radiator secured to the mounting flange. The radiator assembly also includes (i) a heat exchange assembly, (ii) a sealing surface which is configured to define an air flow access opening through which a flow of air is advanced so as to contact the heat exchange assembly, and (iii) a frame member which defines the sealing surface thereon. The frame member is secured to the heat exchange assembly. The radiator assembly further includes a sealing member interposed between the mounting flange and the sealing surface. The sealing member completely surrounds the access opening whereby an air-tight seal is formed between the radiator and the engine cowling when the radiator is secured to the mounting flange.

BEST MODE FOR CARRYING OUT THE INVENTION

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 1:
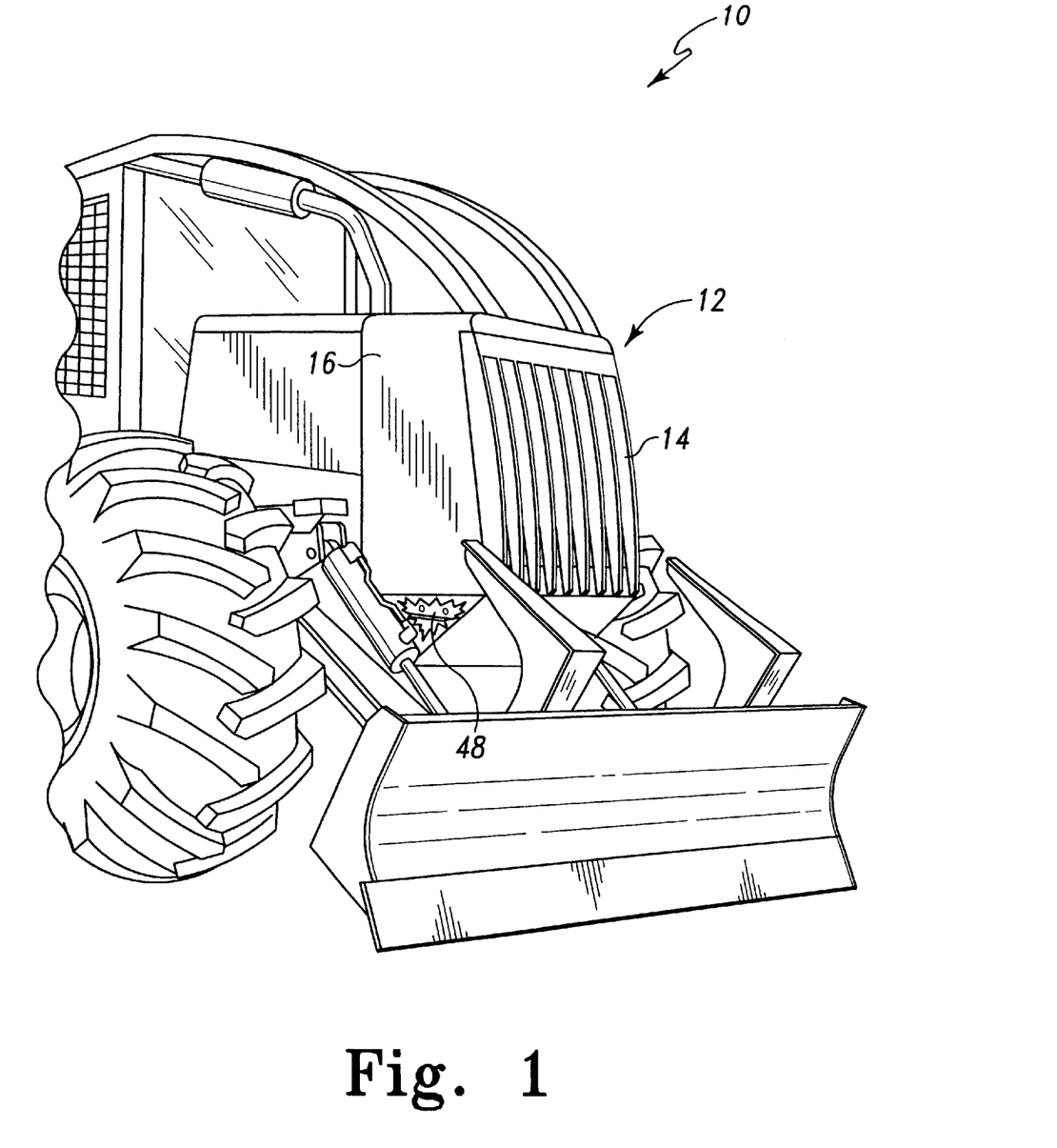
FIG. 1 is a fragmentary perspective view of a work machine which incorporates the features of the present invention therein.
Figure 2:
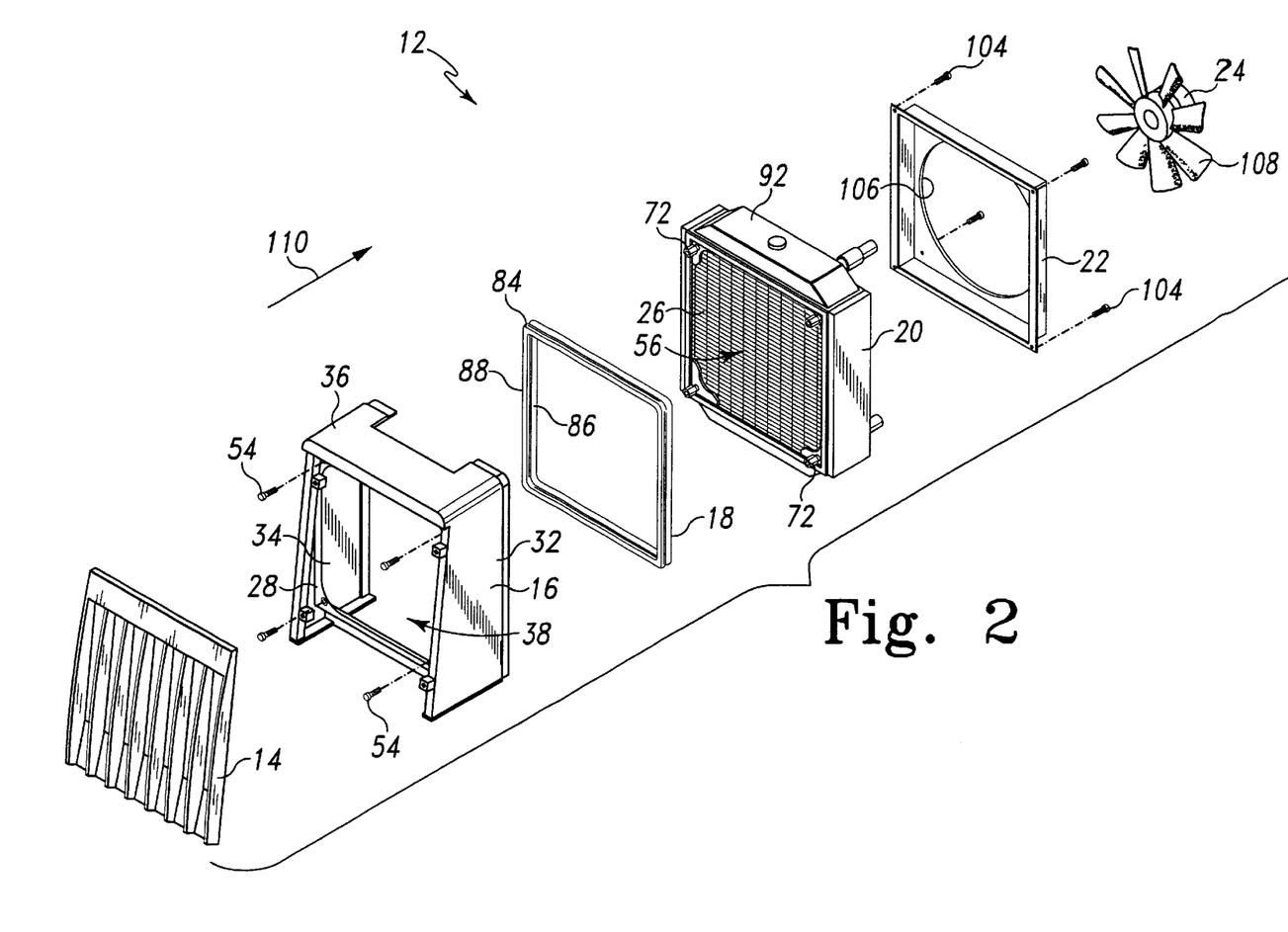
FIG. 2 is an exploded perspective view of the radiator assembly of the work machine of FIG. 1.

Referring now to FIGS. 1–2, there is shown a work machine 10, such as a wheel skidder. The wheel skidder 10 includes a radiator assembly 12 which has a protective grille 14, an engine cowling 16, a sealing member or bulb seal 18, a radiator 20, a rear shroud 22, and a fan assembly 24. The fan assembly 24 generates a flow of air which is pulled or otherwise advanced through a heat exchange assembly 26 of the radiator thereby cooling a fluid, such as engine coolant, advancing therethrough.

The engine cowling 16 has a mounting flange 28 secured thereto. In particular, the engine cowling 16 has a left lateral side structure 32, a right lateral side structure 34, and a top structure 36 which collectively define a radiator chamber 38 (see FIGS. 3 and 4). The mounting flange 28 is configured so as to extend completely around an inner surface 30 of the radiator chamber 38 thereby defining a central passage 40 therethrough.

The left lateral side structure 32 has a fastening flange 42 secured thereto, whereas the right lateral side structure 34 has a fastening flange 44 secured thereto. Each of the fastening flanges 42, 44 has a number of apertures 46 defined therein. The apertures 46 receive a number of bolts (not shown) therein in order to bolt or otherwise fasten the lateral side structures 32, 34 and hence the engine cowling 16 to a chassis 48 (see FIG. 1) of the wheel skidder 10.

Figure 3:
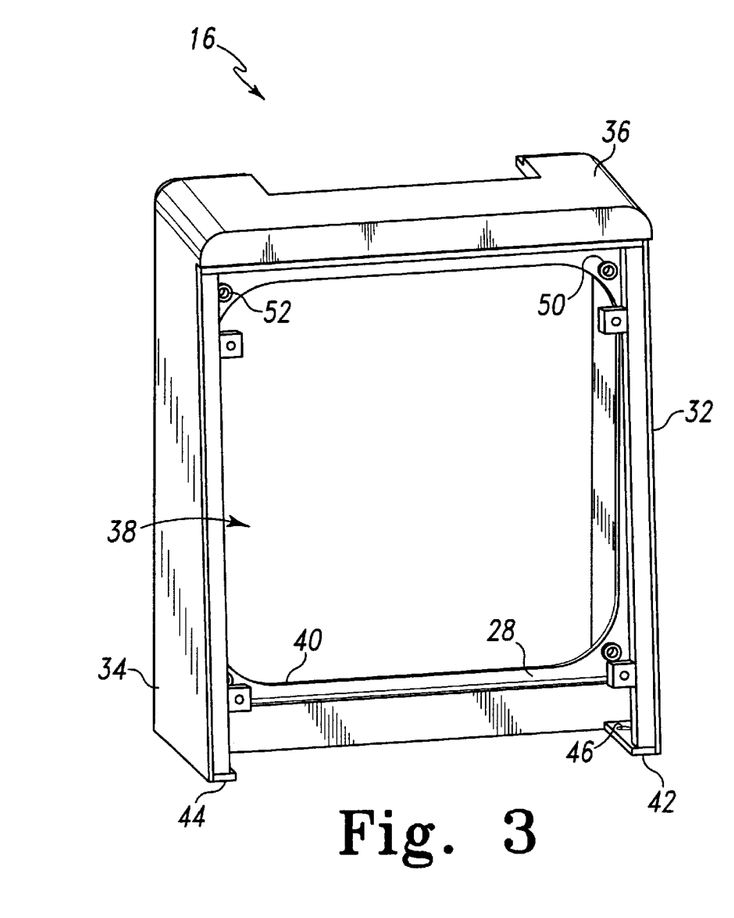
FIG. 3 is a front perspective view of the engine cowling of the radiator assembly of FIG. 2.
Figure 4:
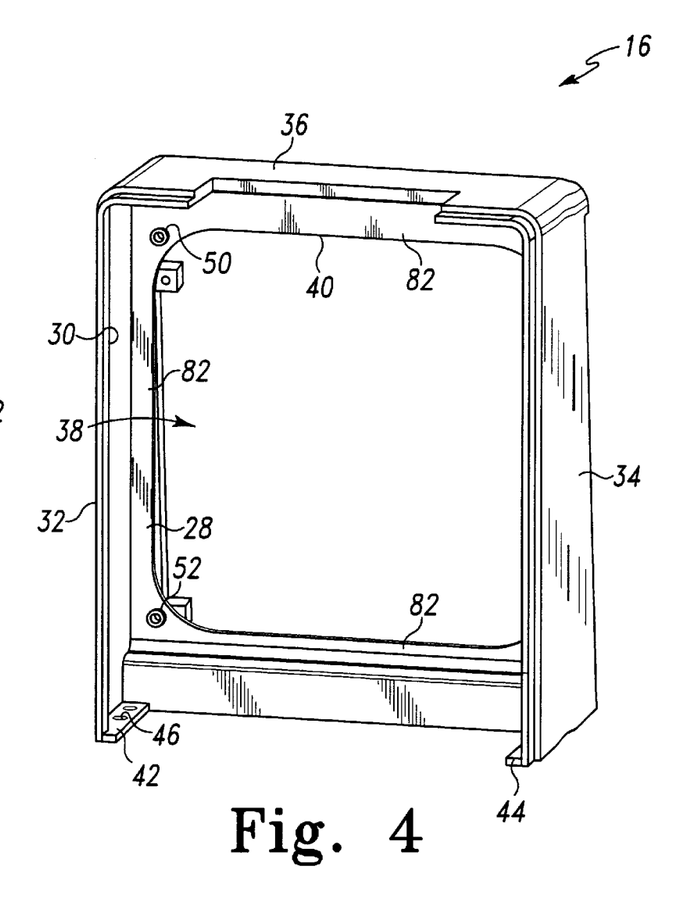
FIG. 4 is a rear perspective view of the engine cowling of the radiator assembly of FIG. 2.

As shown in FIGS. 3 and 4, the mounting flange 28 has a number of apertures 50 defined therein. Each of the apertures 50 preferably has an elastomeric mount 52 positioned therein. As shall be discussed below in more detail, a number of fasteners such as bolts 54 (see FIG. 2) are advanced through the mounts 52 and hence the apertures 50 in order to bolt the radiator 20 to the mounting flange 28.

Figure 5:
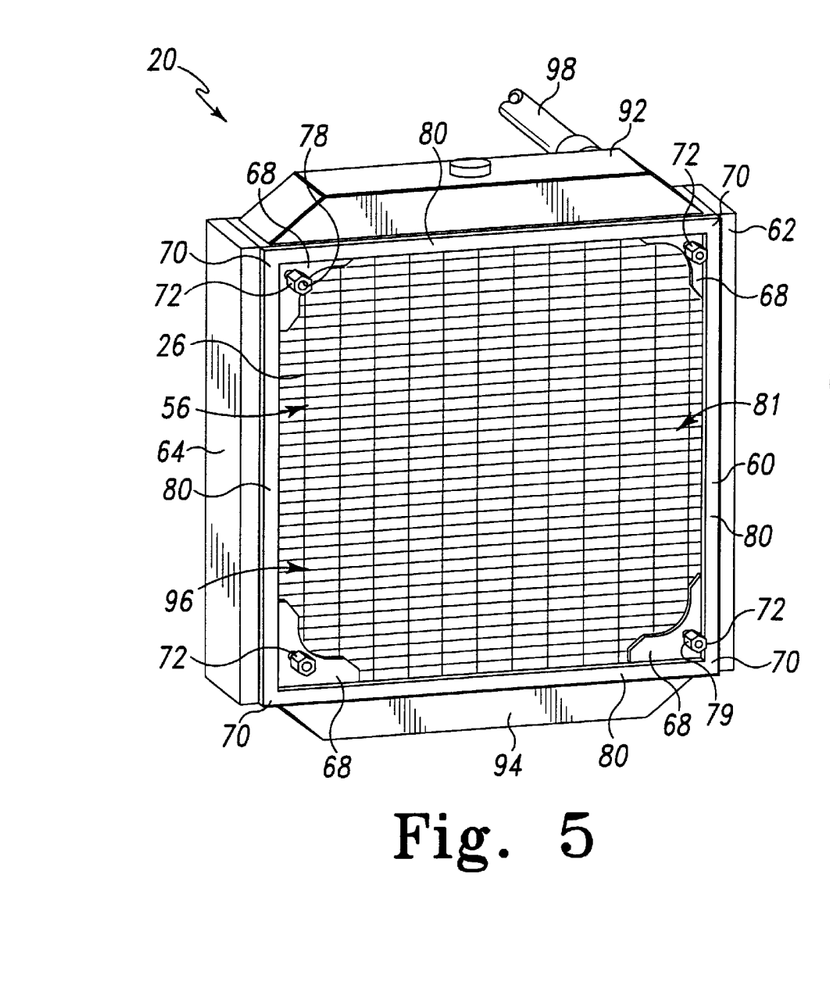
FIG. 5 is a front perspective view of the radiator of the radiator assembly of FIG. 2.
Figure 6:
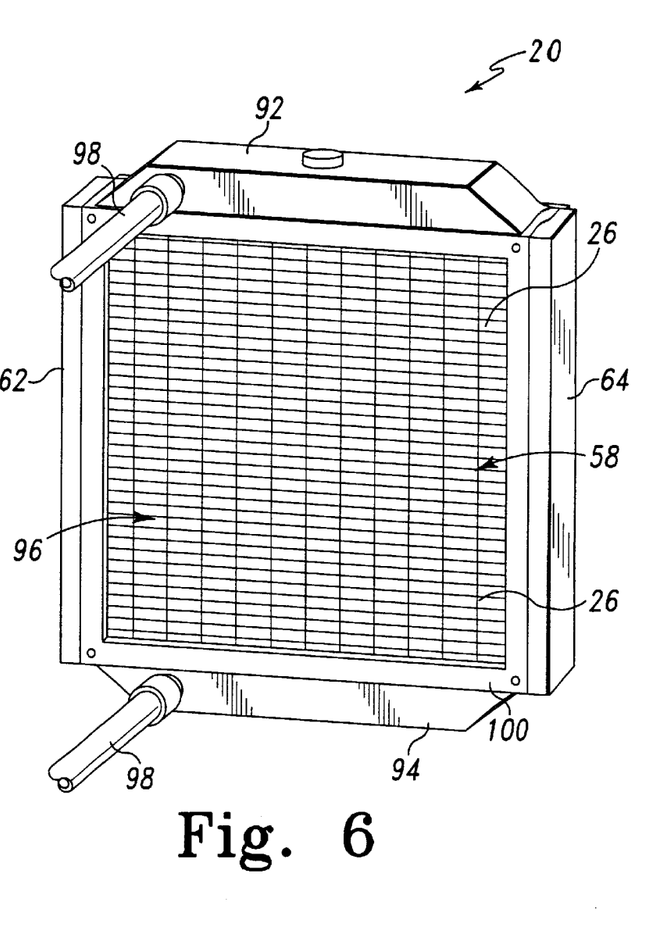
FIG. 6 is a rear perspective view of the radiator of the radiator assembly of FIG. 2.

The radiator 20 includes an upstream side 56 and a downstream side 58, as shown in FIGS. 5 and 6. A flow of air advances from the upstream side 56 of the radiator 20, through the heat exchange assembly 26, and exits through the downstream side 58. Moreover, the radiator 20 includes a frame member 60 secured to the upstream side 56 thereof. The frame member 60 has a left lateral support member 62 and a right lateral support member 64 secured thereto. The lateral support members 62, 64, along with the frame member 60, enhance the structural rigidity of the radiator 20.

Figure 10:
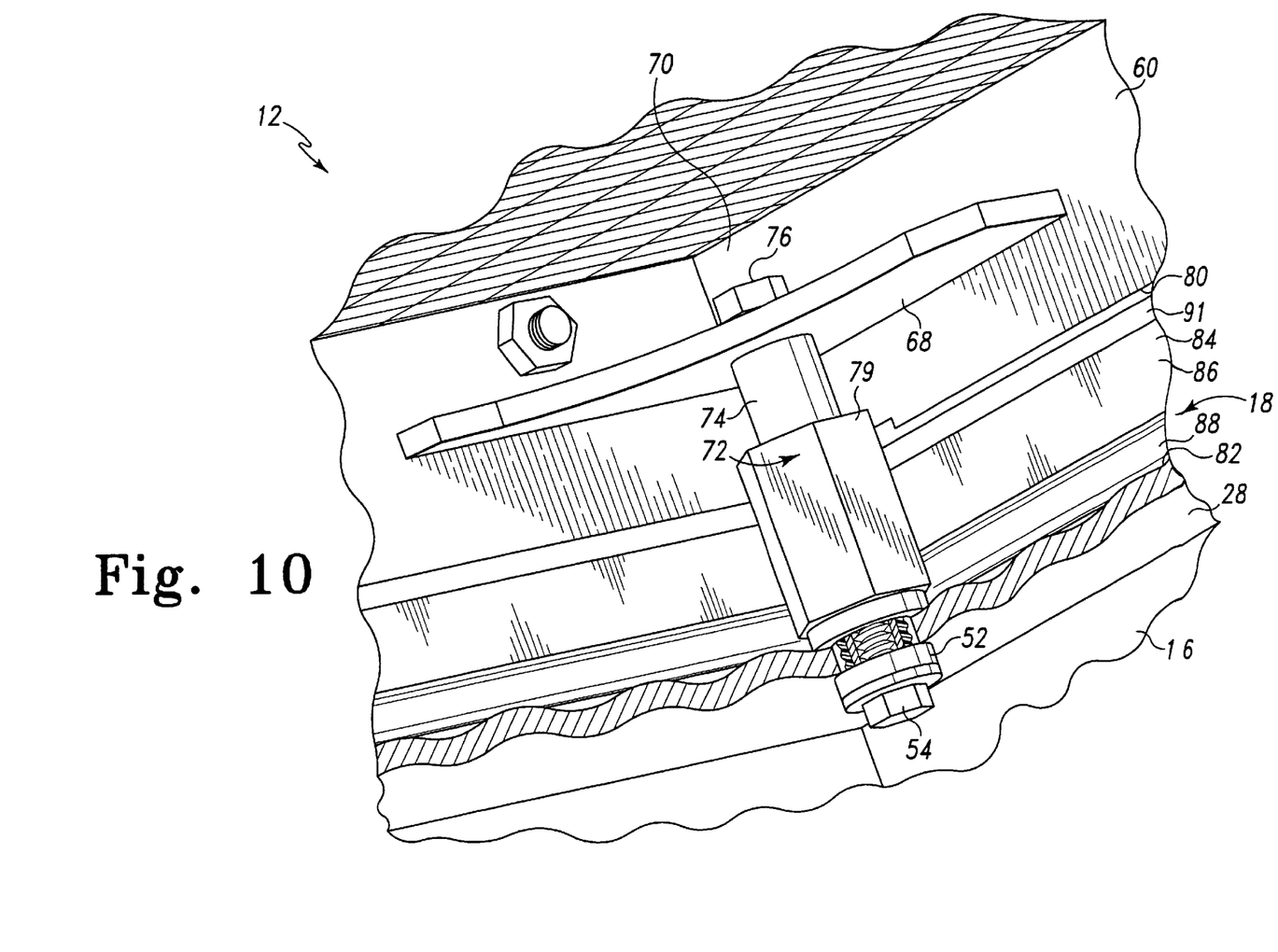
FIG. 10 is an enlarged fragmentary perspective view of the radiator assembly of FIG. 2 which shows the radiator secured to the mounting flange of the engine cowling.

The frame member 60 is substantially rectangularly shaped and has a gusset 68 positioned in each of four frame corners 70. Each of the gussets 68 has a standoff 72 bolted or otherwise secured thereto. In particular, a cylindrical end portion 74 (see FIG. 10) of each of the standoffs 72 is secured to the gussets 68 by a number of bolts 76. A threaded aperture 78 (see FIG. 5) is defined in a tool engaging end portion 79 (see FIG. 10) of each of the standoffs 72. After advancement through the mounts 52, the bolts 54 threadingly engage the threaded apertures 78 thereby securing the frame member 60 and hence the radiator 20 to the mounting flange 28 and hence the engine cowling 16. As shown in FIG. 10, the tool engaging end portion 79 is configured such that a work tool, such as a wrench, may be positioned thereon in order to facilitate installation of the bolts 54 into the threaded apertures 78.

Figure 9:
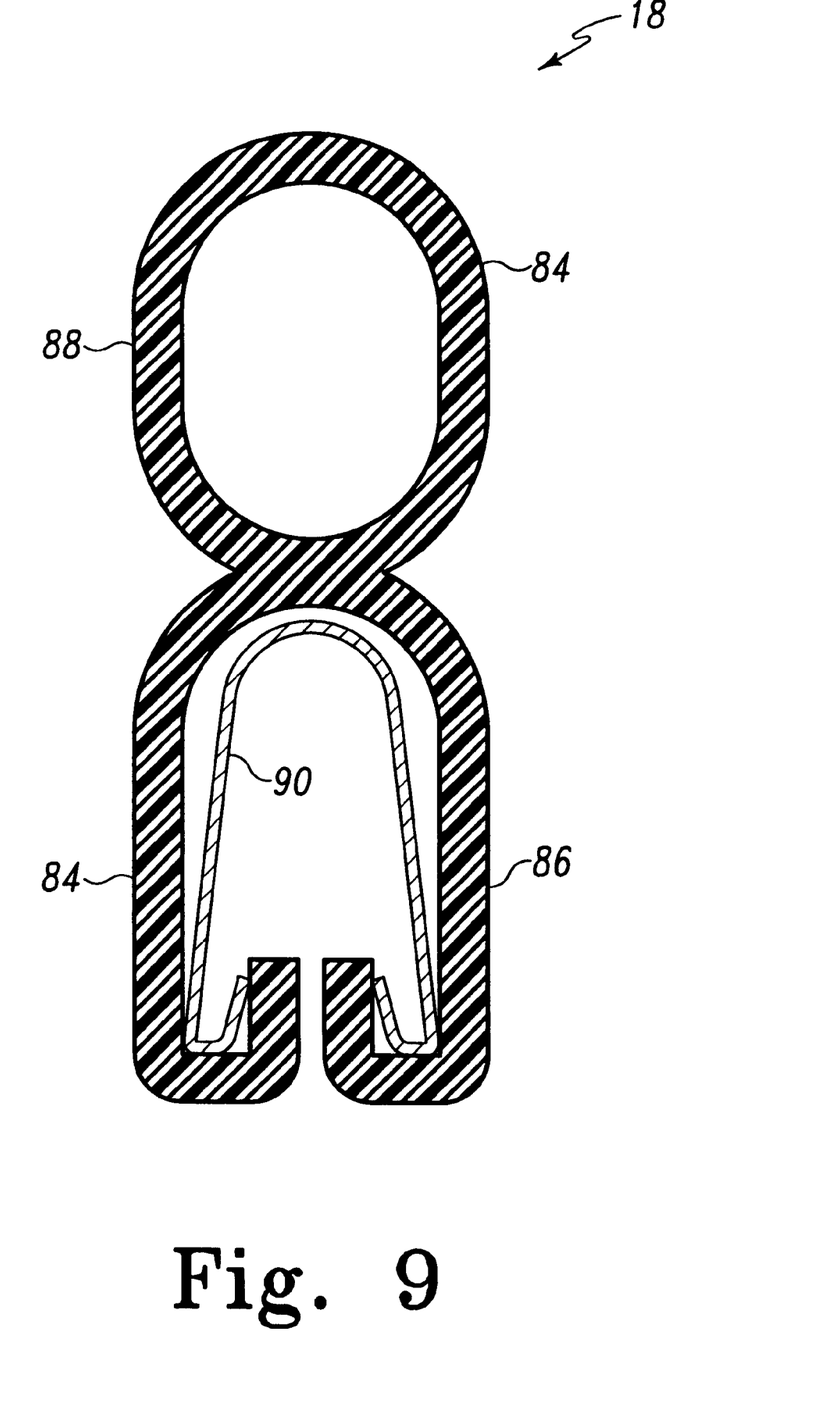
FIG. 9 is an enlarged cross sectional view of the bulb seal of the radiator assembly of FIG. 2.

The frame member 60 includes a sealing surface 80, as shown in FIG. 5, thereby defining an access opening 81 through which a flow of air is directed in order to be advanced through the heat exchange assembly 26 of the radiator 20. The sealing surface 80 is sealingly engaged with a sealing surface 82 defined in the mounting flange 28 (see FIG. 4) when the radiator 20 is secured to the mounting flange 28. In particular, the bulb seal 18 is interposed between the sealing surface 80 of the frame member 60 and the sealing surface 82 of the mounting flange 28. As shown in FIG. 9, the bulb seal 18 has a sealing strip 84 which includes a channel-shaped attaching portion 86 and a cylindrical-shaped sealing portion 88. Moreover, the bulb seal 18 includes a channel-shaped spring clip or core 90 secured to the attaching portion 86. The spring clip 90 and hence the attaching portion 86 are urged against a flange 91 defined in the frame member 60 thereby positioning the sealing portion 88 such that it is disposed around the entire periphery of the access opening 81. It should be appreciated that when the radiator 20 is secured to the mounting flange 28 in the manner described above, the sealing portion 88 of the sealing strip 84 is compressed thereby creating an air-tight seal between the sealing surface 80 of the frame member 60 and the sealing surface 82 of the mounting flange 28, as shown in FIG. 10. Hence, an air-tight seal is created between the radiator 20 and the engine cowling 16. It should further be appreciated that such an air-tight seal is advantageous in that the entire flow of air advancing through the central passage 40 (see FIGS. 3 and 4) is advanced through the access opening 81 and hence through the heat exchange assembly 26 thereby increasing the efficiency associated with the radiator 20. In particular, such an air-tight seal prevents a portion of the flow of air which is being advanced through the central passage 40 from leaking around or otherwise bypassing the heat exchange assembly 26.

The radiator 20 further includes an upper fluid tank 92 and a lower fluid tank 94, as shown in FIGS. 5 and 6. The fluid tanks 92, 94 cooperate with the lateral support members 62, 64 in order to define a heat exchange chamber 96. The heat exchange assembly 26 is positioned in the heat exchange chamber 96 such that a number of hoses 98 associated with the fluid tanks 92, 94 may provide for a flow of a fluid, such as coolant, through the coils (not shown) associated with the heat exchange assembly 26. It should be appreciated that a number of fluid pumps, valves, and other fluid components (not shown) may be provided to facilitate advancement of coolant through the heat exchange assembly 26.

The downstream side 58 of the radiator 20 includes a flat mating surface 100, as shown in FIG. 6. A corresponding flat mating surface 102 is defined in the rear shroud 22 (see FIG. 7). Hence, when the rear shroud 22 is bolted to the radiator 20 via a number of bolts 104 (see FIG. 2), the mating surface 100 is urged into contact with the mating surface 102.

Figure 7:
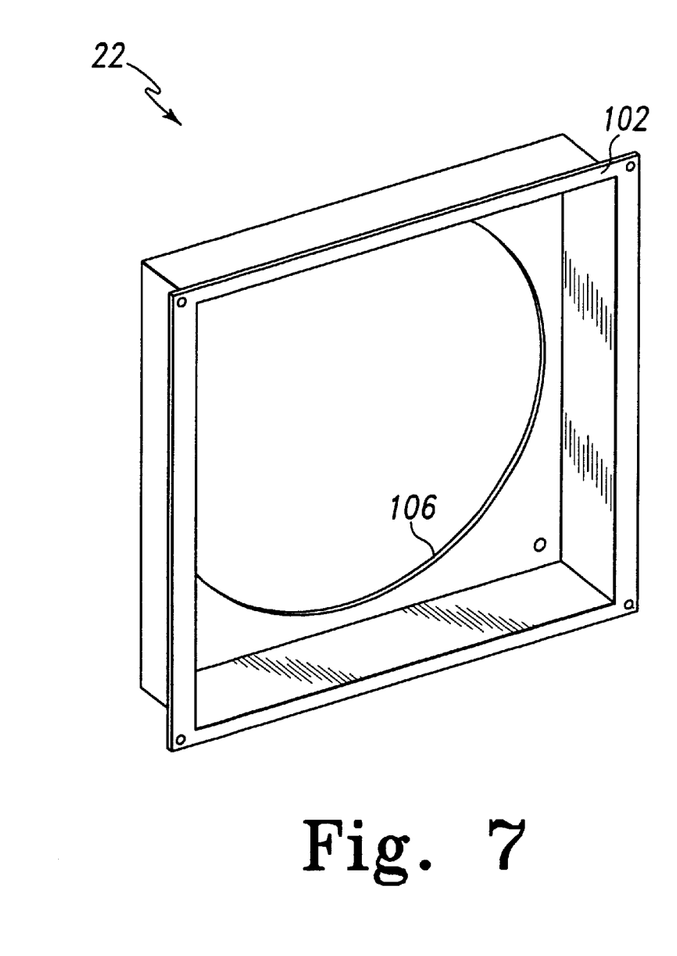
FIG. 7 is a front perspective view of the rear shroud of the radiator assembly of FIG. 2.
Figure 8:
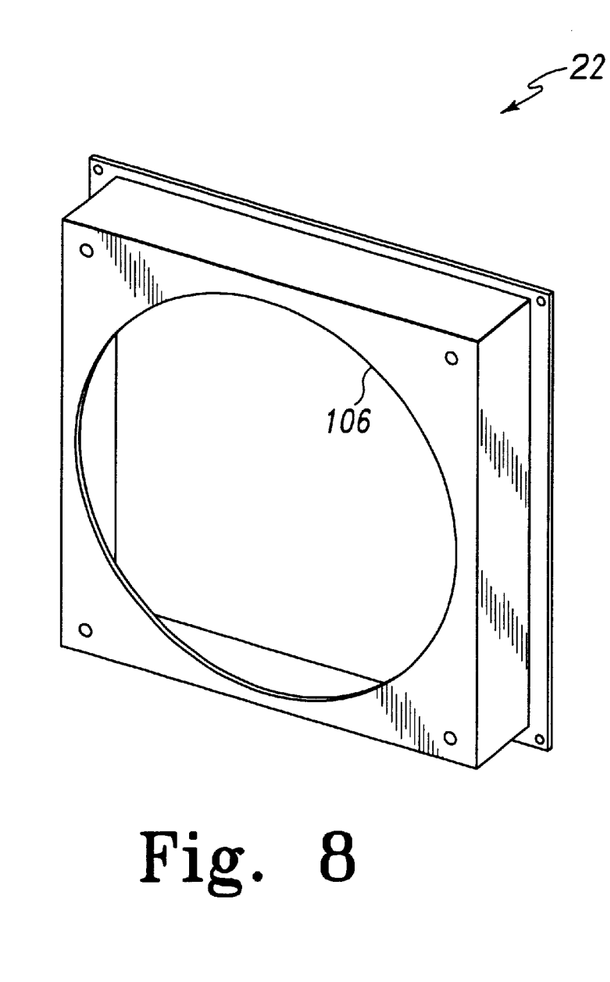
FIG. 8 is a rear perspective view of the rear shroud of the radiator assembly of FIG. 2.

Moreover, the rear shroud 22 has an exit opening 106 defined therein, as shown in FIGS. 7 and 8. The fan assembly 24 is located such that a number of fan blades 108 associated therewith are positioned adjacent the exit opening 106. In particular, the fan assembly 24 is located such that the fan blades 108 are partially received into the exit opening 106. Hence, when the fan assembly 24 is actuated thereby producing a flow of air in the general direction of arrow 110 of FIG. 2, the flow of air is first advanced through the protective grille 14 and thereafter into the radiator chamber 38 of the engine cowling 16. Thereafter, the flow of air is advanced through the central passageway 40 defined in the mounting flange 28, and into the upstream side 56 of the heat exchange assembly 26. It should be appreciated that the compressed bulb seal 18 prevents a portion of the flow of air from leaking around or otherwise bypassing contact with the heat exchange assembly 26 as the flow of air continues to be advanced in the general direction of arrow 110 of FIG. 2. After being impinged on the various coils and fins (not shown) associated with the heat exchange assembly 26, the flow of air exits the downstream side 58 of the heat exchange assembly 26 and is directed through the exit opening 106 of the rear shroud 22.

Industrial Applicability

In operation, the standoffs 72 may first be bolted to the gussets 68 with the bolts 76 so as to secure the standoffs 72 thereto (see FIG. 10). Thereafter, the bulb seal 18 is positioned between the sealing surface 80 of the radiator 20 and the sealing surface 82 of the mounting flange 28. The bolts 54 are then advanced through the mounts 52 and thereafter threadingly engage the threaded apertures 78 defined in the tool engaging end portion 79 of each of the standoffs 72 thereby securing the radiator 20 to the engine cowling 16. It should be appreciated that when the radiator 20 is secured to the engine cowling 16 in such a manner, the sealing portion 88 of the bulb seal 18 (see FIG. 9) is compressed thereby creating an air-tight seal between the sealing surface 80 of the radiator 20 and the sealing surface 82 of the mounting flange 28.

The rear shroud 22 may then be bolted to the radiator 20 with the bolts 104 thereby causing the mating surface 102 of the rear shroud to be urged into contact with the mating surface 100 of the radiator 20. The fan assembly 24 may then be mounted such that the fan blades 108 associated therewith are positioned adjacent the exit opening 106 of the rear shroud.

It should be appreciated that either prior to or subsequent to assembling the radiator assembly 10 in the manner described, bolts or other types of fasteners (not shown) may be inserted through the apertures 46 and into the chassis 48 thereby securing the engine cowling 16 to the chassis 48 of the wheel skidder 10.

During operation of the wheel skidder 10, the fan assembly 24, along with forward advancement of the wheel skidder 10, creates a flow of air in the general direction of arrow 110 of FIG. 2. The flow of air is first advanced through the protective grille 14 and thereafter into the radiator chamber 38 of the engine cowling 16. The flow of air is then advanced through the central passageway 40 defined in the mounting flange 28, and into the upstream side 56 of the heat exchange assembly 26. It should be appreciated that the compressed bulb seal 18 prevents a portion of the flow of air from leaking around or otherwise bypassing contact with the heat exchange assembly 26 as the flow of air continues to be advanced in the general direction of arrow 110 of FIG. 2.

After impinging upon the various coils and fins (not shown) associated with the heat exchange assembly 26, the flow of air exits the downstream side 58 of the heat exchange assembly 26 and is directed through the exit opening 106 of the rear shroud 22.

From the above discussion, it should be appreciated that the radiator assembly 10 overcomes numerous drawbacks associated with radiator assemblies which have heretofore been designed. For example, securing the radiator 20 to the mounting flange 28 in the manner herein described (as opposed to securing the lower portion thereof directly to the chassis 48, and an upper portion thereof to the lateral side structures 32, 34 of the engine cowling 16), reduces the frequency and magnitude of vibrations or loads exerted on the radiator 20 through the chassis 48 as the wheel skidder 10 is operated or otherwise advanced across rough terrain, such as the terrain present in a logging operation. Moreover, securing the radiator 20 to the mounting flange 28 in such a manner reduces, if not eliminates, twisting and torquing of the radiator 20 during operation of the wheel skidder 10.

In addition, by creating an air-tight seal between the radiator 20 and the engine cowling 16 (i.e. the seal created between the sealing surface 80 of the radiator 20 and the sealing surface 82 of the mounting flange 28 by the bulb seal 18), leakage of air around the heat exchange assembly 26 of the radiator 20 is reduced relative to radiator assemblies which have heretofore been designed. It should be appreciated that such a reduction in air leakage advantageously increases the efficiency of the cooling system associated with the wheel skidder 10 relative to radiator assemblies which have heretofore been designed.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

For example, although the bulb seal 18 is herein described as being secured to the frame member 60, and has numerous advantages thereby in the present invention, it should be appreciated that the bulb seal 18 may be secured to other components associated with the radiator assembly 12. For example, the sealing surface 82 of the mounting flange 28 may be configured to include a flange (similar to the flange 91) to which the spring clip 90 and hence the attaching portion 86 of the bulb seal 18 may be urged against thereby securing the bulb seal 18 thereto.

Moreover, it should be appreciated that a number of the components associated with the radiator assembly 12 may be modified to fit the requirements of a particular radiator assembly design. For example, the standoffs 72 may be configured so as not to include a cylindrical end portion 74 thereby allowing the entire standoff to be configured similar to the tool engaging end portion 79 of the standoff 72.

What is claimed is:

1. A radiator assembly of a work machine, comprising:
   an engine cowling defining an interior surface, wherein (i) said engine cowling has a mounting flange secured to said interior surface, (ii) said mounting flange extends completely around said interior surface so as to define a central passage therethrough, and (iii) said engine cowling is fastened to a chassis of said work machine;
   a radiator secured to said mounting flange, wherein (i) said radiator includes a heat exchange assembly, and (ii) said radiator further includes a sealing surface which is configured to define an air flow access opening through which a flow of air is advanced so as to contact said heat exchange assembly; and
   a sealing member interposed between said mounting flange and said sealing surface, wherein said sealing member completely surrounds said access opening whereby an air-tight seal is formed between said radiator and said engine cowling when said radiator is secured to said mounting flange.

2. The assembly of claim 1, wherein:
   said radiator further includes a frame member which defines said sealing surface thereon, and
   said frame member is secured to said heat exchange assembly.

3. The assembly of claim 2, wherein:
   said frame member is substantially rectangularly shaped so as to define a plurality of frame corners, and said frame member includes a gusset positioned in each of said plurality of frame corners.

4. The assembly of claim 3, further comprising a stand-off secured to each gusset, wherein:

said mounting flange of said engine cowling is secured to said stand-off.

5. The assembly of claim 1, wherein:

said sealing member includes a bulb seal, said bulb seal completely surrounds said air flow access opening of said sealing surface of said radiator, and said bulb seal is interposed between said mounting flange of said engine cowling and said sealing surface.

6. The assembly of claim 1, wherein:

said engine cowling includes a left lateral side structure, a right lateral side structure, and a top structure which are configured to define a radiator chamber, said mounting flange is secured to each of said left lateral side structure, said right lateral side structure, and said top structure, and each of said left lateral side structure and said right lateral side structure is fastened to said chassis of said work machine.

7. The assembly of claim 1, wherein:

said radiator further includes a left lateral support member, a right lateral support member, an upper fluid tank, and a lower fluid tank, said left lateral support member, said right lateral support member, said upper fluid tank, and said lower fluid tank are secured together so as to define a heat exchange chamber, and said heat exchange assembly is positioned within said heat exchange chamber.

8. The assembly of claim 1, further comprising a rear shroud, wherein:

said radiator has an upstream side and a downstream side, said upstream side of said radiator is secured to said mounting flange, and said rear shroud is secured to said downstream side of said radiator.

9. The assembly of claim 8, further comprising a fan, wherein:

said rear shroud defines an exit opening, said rear shroud directs said flow of air exiting said heat exchange assembly through said exit opening, and said fan is positioned adjacent to said exit opening.

10. A radiator assembly of a work machine, comprising:

an engine cowling defining an interior surface, wherein (i) said engine cowling has a mounting flange secured to said interior surface, (ii) said mounting flange extends completely around said interior surface so as to define a central passage therethrough, (iii) said engine cowling includes a left lateral side structure, a right lateral side structure, and a top structure which are configured to define a radiator chamber, (iv) said mounting flange is secured to each of said left lateral side structure, said right lateral side structure, and said top structure, and (v) each of said left lateral side structure and said right lateral side structure is fastened to a chassis of said work machine;

a radiator secured to said mounting flange, wherein (i) said radiator includes a heat exchange assembly, (ii) said radiator further includes a sealing surface which is configured to define an air flow access opening through which a flow of air is advanced so as to contact said heat exchange assembly, (iii) said radiator further includes a frame member which defines said sealing surface thereon, and (iv) said frame member is secured to said heat exchange assembly; and a sealing member interposed between said mounting flange and said sealing surface, wherein said sealing member completely surrounds said access opening whereby an air-tight seal is formed between said radiator and said engine cowling when said radiator is secured to said mounting flange.

11. The assembly of claim 10, wherein:

said frame member is substantially rectangularly shaped so as to define a plurality of frame corners, and said frame member includes a gusset positioned in each of said plurality of frame corners.

12. The assembly of claim 11, further comprising a stand-off secured to each gusset, wherein:

said mounting flange of said engine cowling is secured to said stand-off.

13. The assembly of claim 10, wherein:

said sealing member includes a bulb seal, said bulb seal completely surrounds said air flow access opening of said sealing surface of said radiator, and said bulb seal is interposed between said mounting flange of said engine cowling and said sealing surface.

14. The assembly of claim 10, wherein:

said radiator further includes a left lateral support member, a right lateral support member, an upper fluid tank, and a lower fluid tank, said left lateral support member, said right lateral support member, said upper fluid tank, and said lower fluid tank are secured together so as to define a heat exchange chamber, and said heat exchange assembly is positioned within said heat exchange chamber.

15. The assembly of claim 10, further comprising a rear shroud, wherein:

said radiator has an upstream side and a downstream side, said upstream side of said radiator is secured to said mounting flange, and said rear shroud is secured to said downstream side of said radiator.

16. The assembly of claim 15, further comprising a fan, wherein:

said rear shroud defines an exit opening, said rear shroud directs said flow of air exiting said heat exchange assembly through said exit opening, and said fan is positioned adjacent to said exit opening.

* * * * *